G. P. MacGOWAN.
BABY CARRIER FOR VEHICLES.
APPLICATION FILED MAR. 29, 1917.
1,261,951.
Patented Apr. 9, 1918.
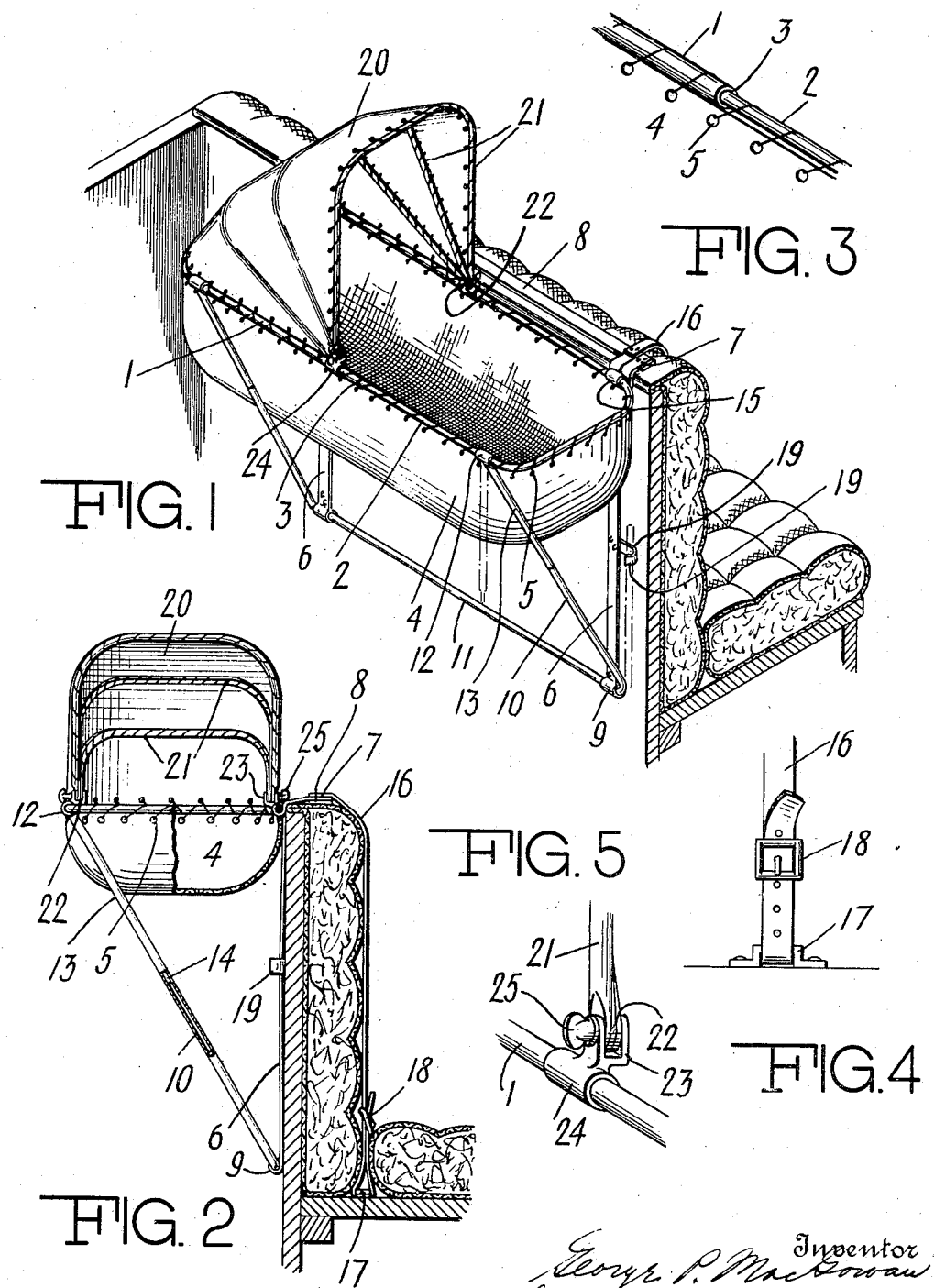

UNITED STATES PATENT OFFICE.

GEORGE P. MacGOWAN, OF NEW YORK, N. Y.

BABY-CARRIER FOR VEHICLES.

1,261,951. Specification of Letters Patent. Patented Apr. 9, 1918.

Application filed March 29, 1917. Serial No. 158,228.

*To all whom it may concern:*

Be it known that I, GEORGE P. MAC-GOWAN, a citizen of the United States, residing in the borough of Manhattan, city, county, and State of New York, have invented certain new and useful Improvements in Baby-Carriers for Vehicles, of which the following is a specification.

The present invention relates to a portable baby carrier for vehicles and is particularly applicable to automobiles, railroad coaches and the like.

One of the objects of the invention is to provide a carrier which will be inexpensive in cost of manufacture and one which can be readily applied to the back of a seat and be supported thereby.

A further object of the invention is to provide a carrier which is collapsible in form in order that the same can be dropped and folded against the back of the seat, which supports it so as to be out of the way when not in use, this being accomplished expeditiously without removing the carrier from the seat.

A still further object of the invention is to provide adjustable fastening means for supporting the carrier by the seat in order that variations in thickness of upholstering may be taken care of.

In the accompanying drawings, I have illustrated by way of example one preferable embodiment of the invention, in which like numerals designate like parts throughout the respective views. Referring to the drawings, Figure 1 is a view in perspective of a carrier embodying my invention, the same being shown in supported position at the back of an upholstered seat of an automobile or other vehicle, a fragmentary portion of the latter being shown.

Fig. 2 is an end view, parts being shown broken away and in cross section to illustrate certain details.

Fig. 3 is a view in enlarged detail, of a fragmentary portion of the main carrier frame.

Fig. 4 is a view in front elevation of the means employed for fastening the ends of the adjustable straps which hold the carrier in position.

Fig. 5 is a view in perspective on an enlarged scale of the friction clamping means for holding the top of the carrier in adjusted position.

The frame work of the carrier is made of flat strips of metal and tubular metal stock and comprises a main basket supporting frame made of two pieces of U-shaped tubular stock, 1 and 2, one of larger diameter than the other, so that the ends will telescope as at 3. This enables the frame to be longitudinally adjusted to vary the width of the carrier as may be desired. To this main frame is attached a fabric basket 4, by means of lacings 5, or in any other suitable manner.

To support the frame and basket in position against the back of a seat, I provide a collapsible supporting frame comprising a pair of flat metal strips 6, which rest against the back of the seat in downward position and which have their ends 7 bent over at an angle so as to rest upon the top of the upholstering of the seat as at 7, these ends being connected by a cross strip 8, which keeps them in alinement and rigidly attached. This trip 8 also rests on the top of the upholstering and serves to prevent the upholstering from becoming damaged due to the superimposed weight of the carrier when filled.

The lower ends of these metal strips 9 are turned over to form supporting eyes and journals for supporting props or arms 10, these props being connected by a cross member 11 and with sleeve-like journals 12, which encircle the main frame of the carrier so as to support it in its proper position. The arms 10 are of two-part construction, the upper section of each arm indicated by the numeral 13 being provided with a centrally located pin 14 (see Fig. 2), which fits within the bore of the lower tubular arm portion. In this manner, a sectional arm is provided which may be readily separated or disconnected when it is desired to lower the carrier to its inoperative position, as will be more fully explained. Fastened to the bar 8 at each extremity thereof is a sleeve 15 which encircles the main frame of the carrier to support it. Connected with the upper extremities of the strips 6 and 8 are a pair of flexible strap members 16, which are designed to go over the upholstery at the back of the seat and be suitably fastened at their lower extremities to suitable devices in order to partially take up the strain exerted by the weight of the carrier. It will be understood that the strips owing to their length afford an adjustable fastening means which will take care of variations in the thickness of the upholstery of different seats to which it might be desired to attach the carrier. The lower ends of the strap are reeved through a pair of brackets 17, which are fastened to the seat, suitable buckles being provided whereby proper adjustments may be had.

It will be understood that the frame to which the basket is laced is supported by swivel connections 12 and 15, so that when the arm parts 13 are withdrawn from the lower portions, which may be done by tilting the basket slightly upward, in order to withdraw the pins 14 from the lower arm part, the basket may then be permitted to swing down, so that its main frame will lie against the back of the seat. The basket being made of fabric will not impede this operation, the latter being collapsed or folded within the frame work in a manner thought to be well understood. When in this folded position, the arm parts 13 will, due to the swiveled connection at 12, swing down vertically and also be out of the way. In order to retain the parts in inoperative position, so as to be compactly placed out of the way, I provide a pair of spring clips 19 projecting from the side strips 6 which are adapted to give and catch the arms when they are pressed thereagainst.

The carrier is provided with a folding fabric top 20, the bows 21 of which are provided with flat faced washer-like extremities 22 which are received within a bracket 23 supported by the main frame of the basket as at 24. Any suitable adjustable clamping means may be provided for holding the bows in adjusted position, a wing nut 25 being illustrated for the purpose.

It will be understood that while I have illustrated my carrier as applied to an upholstered seat of an automobile, it is equally applicable to the seats of railway coaches and other vehicles.

While I have illustrated one preferable form in which my invention may find embodiment, I do so merely in an illustrative sense and do not wish to be unnecessarily restricted in matters of details as these may be changed without departing from the spirit and scope of my invention, as defined by the following claims.

Having thus described my invention, I claim:

1. A carrier attachment for vehicles comprising a basket supporting frame made of two U-shaped sections telescopically mounted with respect to one another, a folding frame support for coöperatively associating the basket supporting frame with a seat structure comprising a pair of vertically arranged supporting arms having swiveled connection at one side of the basket frame and a pair of associated arms of two-part construction swively connected with the opposite side of the basket frame and the lower extremities of the vertical arms.

2. A carrier attachment for vehicles comprising a basket supporting frame, a supporting bracket for said frame, said bracket including two pairs of attaching and supporting members arranged diametrically opposite each other at two sides of the basket supporting frame, said attaching members being cross connected to hold them substantially in alinement, one of the cross connecting members being arranged to rest upon the upholstery of a seat to which the carrier is attached and a pair of flexible strap members adapted to be drawn over the upholstery at the back of the seat and fastened to a rigid portion of the seat in order to hold the carrier in position.

3. A carrier attachment for vehicles comprising a basket supporting frame, a folding frame support for coöperatively associating the basket supporting frame with a seat structure comprising a pair of vertically arranged supporting arms having a movable connection at one side of the basket frame, a cross-connecting member at the lower extremity of said supporting arms adapted to engage the back of the seat structure and a pair of associated arms connected with the basket frame at points spaced from the connection of the first-mentioned arms, said second pair of arms having operable connection with the lower extremities of the first-mentioned arms and means associated with said first-mentioned arms for extending over the upholstery of the seat structure for supporting the carrier in operative position.

4. A carrier attachment for vehicles comprising a basket supporting frame, a supporting bracket for said frame, said bracket comprising two pairs of attaching and supporting members operably attached at one extremity to the basket frame and at the other extremity together and a cross connecting member operably associated with the lower extremities of said arms and adapted to extend across the back of the seat structure and means connected with one set of the arms extending across the seating upholstery for holding the basket in operative position.

5. A carrier attachment for vehicles comprising a basket supporting frame, a supporting bracket for said frame, said bracket comprising a pair of vertically arranged supporting arms hingedly attached to said frame and having means connected thereto adapted to extend over the top of the seat structure for supporting the basket in operative position and bracket arms operatively associated with the lower extremities of said vertical arms, said bracket arms extending angularly with relation to said supporting arms and having operative connection with the basket frame.

6. A carrier attachment for vehicles, including a main basket supporting frame, a fabric basket laced thereto, means for supporting said frame in horizontal position to the back of a vehicle seat, said means comprising a pair of depending arms having eyes at each extremity, the upper eyes encircling the frame of the carrier, a pair of arms swiveled in the lower eyes of said depending members, said arms also being swivelly connected with the basket frame and a pair of flexible strap members for fastening the carrier to a seat.

GEORGE P. MacGOWAN.